(12) United States Patent
Hessler et al.

(10) Patent No.: US 8,397,512 B2
(45) Date of Patent: Mar. 19, 2013

(54) FLOW DEVICE FOR TURBINE ENGINE AND METHOD OF ASSEMBLING SAME

(75) Inventors: William Kirk Hessler, Greer, SC (US); Predrag Popovic, Simpsonville, SC (US); Wei A. Chen, Greer, SC (US); Tony Keith Davis, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1013 days.

(21) Appl. No.: 12/197,838

(22) Filed: Aug. 25, 2008

(65) Prior Publication Data

US 2010/0043441 A1 Feb. 25, 2010

(51) Int. Cl.
F02C 1/00 (2006.01)

(52) U.S. Cl. ............................................ 60/759; 60/752

(58) Field of Classification Search ............. 60/752–760
See application file for complete search history.

(56) References Cited

U.S. PATENT DOCUMENTS

| | | | |
|---|---|---|---|
| 3,608,309 A * | 9/1971 | Hill et al. .......................... | 60/748 |
| 3,851,462 A | 12/1974 | Vranos | |
| 4,297,842 A * | 11/1981 | Gerhold et al. .................. | 60/776 |
| 4,719,748 A | 1/1988 | Davis, Jr. et al. | |
| 4,872,312 A * | 10/1989 | Iizuka et al. ..................... | 60/760 |
| 5,253,478 A * | 10/1993 | Thibault et al. ................. | 60/733 |
| 5,596,870 A | 1/1997 | Dillard et al. | |
| 5,775,450 A | 7/1998 | Porter et al. | |
| 6,301,877 B1 | 10/2001 | Liang et al. | |
| 6,412,268 B1 * | 7/2002 | Cromer et al. .................. | 60/772 |
| 6,494,044 B1 | 12/2002 | Bland | |
| 6,546,627 B1 * | 4/2003 | Sekihara et al. ............. | 29/889.1 |
| 6,571,560 B2 * | 6/2003 | Tatsumi et al. .................. | 60/753 |
| 2001/0032453 A1 * | 10/2001 | Tatsumi et al. ............. | 60/39.31 |
| 2003/0010014 A1 * | 1/2003 | Bland et al. .................. | 60/39.37 |
| 2005/0144953 A1 * | 7/2005 | Martling et al. ................. | 60/752 |
| 2005/0179352 A1 | 8/2005 | Hayashi et al. | |
| 2005/0247062 A1 * | 11/2005 | Jeppel et al. .................... | 60/752 |
| 2005/0268613 A1 | 12/2005 | Intile et al. | |
| 2005/0268615 A1 | 12/2005 | Bunker et al. | |
| 2007/0175220 A1 | 8/2007 | Bland | |
| 2007/0180827 A1 | 8/2007 | Dawson et al. | |
| 2011/0107766 A1 * | 5/2011 | Davis et al. ..................... | 60/755 |

FOREIGN PATENT DOCUMENTS

EP 1 207 273 A2 5/2002

* cited by examiner

*Primary Examiner* — Gerald Sung
(74) *Attorney, Agent, or Firm* — Armstrong Teasdale LLP

(57) ABSTRACT

A method for assembling a gas turbine engine includes coupling a transition piece between a combustor liner and a nozzle assembly. The method also includes extending a first portion of a flow sleeve from the transition piece about at least a portion of the combustor liner. The method further includes coupling a second portion of the flow sleeve to the first portion of the flow sleeve such that the flow sleeve second portion extends from the flow sleeve first portion and at least partially about at least a portion of the transition piece. The flow sleeve second portion includes a scoop that cooperates with the transition piece to at least partially define a unitary cooling air passage that includes a unitary scoop-shaped opening. The scoop is oriented to introduce a substantially uniform cooling air flow to the transition piece.

20 Claims, 5 Drawing Sheets

FLOW DEVICE FOR TURBINE ENGINE AND METHOD OF ASSEMBLING SAME

BACKGROUND OF THE INVENTION

The subject matter disclosed herein generally relates to gas turbine engines and more particularly, to flow sleeves used with gas turbine engines.

At least some known gas turbine engines include a transition piece that extends between a combustor assembly and a turbine nozzle assembly. Such transition pieces channel combustion gases from the combustor assembly to the turbine nozzle assembly. To control an operating temperature of the transition piece, at least some known engines channel cooling air from a compressor towards the transition piece. More specifically, in at least some known gas turbine engines, the cooling air is channeled from the compressor into a plenum that circumscribes at least a portion of the transition piece. As the cooling air flows through the plenum, the transition piece is cooled. A portion of the spent cooling air is then channeled from the plenum into a cooling passage defined between a combustor liner coupled upstream from the transition piece and a flow sleeve extending around the combustor liner. Cooling air entering the cooling passage is channeled towards the combustor assembly.

To enhance the cooling of the transition piece, at least some known transition pieces include turbulence-promoting ribs or turbulators that extend outward from an outer surface of the transition piece. Other known transition pieces include an impingement sleeve that includes a plurality of impingement passages extending about the transition piece. Some known impingement sleeves include a scoop-like device that enables air to enter the impingement passages. Although such cooling features enhance cooling of a portion of the transition piece, operating temperature profiles of the transition piece for all operating conditions may not be fully predictable and some portions of the transition piece may require additional cooling. Retrofitting existing gas turbine engines with replacement transition pieces that include such cooling features may be expensive, time-consuming, and may require that the gas turbine engine be off-line for an extended period of time. Furthermore, such cooling features may increase thermal stresses in the transition piece which over time, may shorten a useful life of the transition piece. Therefore, methods and/or apparatus that facilitate a uniform cooling of a transition piece are desired.

BRIEF DESCRIPTION OF THE INVENTION

In one aspect, a method for assembling a gas turbine engine is provided. The method includes coupling a transition piece between a combustor liner and a nozzle assembly. The method also includes extending a first portion of a flow sleeve from the transition piece about at least a portion of the combustor liner. The method further includes coupling a second portion of the flow sleeve to the first portion of the flow sleeve such that the flow sleeve second portion extends from the flow sleeve first portion and at least partially about at least a portion of the transition piece. The flow sleeve second portion includes a scoop that cooperates with the transition piece to at least partially define a unitary cooling air passage that includes a unitary scoop-shaped opening. The scoop is oriented to introduce a substantially uniform cooling air flow to the transition piece.

In another aspect, a combustor assembly for use with a turbine engine is provided. The combustor assembly includes a combustor liner coupled in flow communication with a transition piece. The combustor assembly also includes a flow device. The flow device includes a first portion sized to at least partially extend about the combustor liner. The flow device also includes a second portion coupled to and extending from the first portion. The flow device second portion at least partially extends about at least a portion of the transition piece. The flow device second portion includes a scoop that cooperates with the transition piece to define a unitary cooling air passage including a unitary scoop-shaped opening such that the scoop is oriented to introduce a substantially uniform cooling air flow to the transition piece.

In a further aspect, a gas turbine engine is provided. The gas turbine engine includes a transition piece extending in flow communication between a combustor liner and a nozzle assembly. The engine also includes a flow device. The flow device includes a first portion sized to at least partially extend about the combustor liner. The flow device also includes a second portion coupled to and extending from the first portion. The flow device second portion at least partially extends about at least a portion of the transition piece. The flow device second portion includes a scoop that cooperates with the transition piece to define a unitary cooling air passage including a unitary scoop-shaped opening such that the scoop is oriented to introduce a substantially uniform cooling air flow to the transition piece.

The methods and apparatus for assembling gas turbine engines described herein facilitates operation of such gas turbines. Specifically, as described in more detail below, extending a flow sleeve with a predetermined shape, configuration, and/or orientation about a transition piece facilitates directed and uniform cooling air flow to predetermined portions of the transition piece. Moreover, installing flow sleeve extensions to existing flow sleeves reduces hardware procurement and installation activities, thereby reducing capital and labor costs associated with existing gas turbine engine retrofits.

DETAILED DESCRIPTION OF THE INVENTION

The methods and apparatus for assembling gas turbine engines described herein facilitate operation of such gas turbines. Specifically, as described in more detail below, extending a flow sleeve with a predetermined shape, configuration, and/or orientation about a transition piece facilitates cooling predetermined portions of the transition piece. More specifically, the flow sleeve facilitates channeling cooling air flow to the top portion of the associated transition piece. Such cooling air flow facilitates decreasing an operating temperature of the transition piece and thereby extends a useful life expectancy of the transition piece by reducing thermal stresses induced in the transition piece. Also, as described herein, the flow sleeve can be shaped, configured, and/or orientated to facilitate channeling cooling air to other engine components in the vicinity of the transition piece and/or the flow sleeve, such as, for example, frame mounting brackets. Moreover, installing flow sleeve extensions to existing flow sleeves facilitates reducing hardware procurement and installation, thereby reducing capital and labor costs associated with retrofitting existing gas turbine engines. Furthermore, extending the flow sleeve about the transition piece facilitates the ease of manufacture and the production of a more repeatable airflow about each transition piece within the gas turbine engine.

Figure 1:
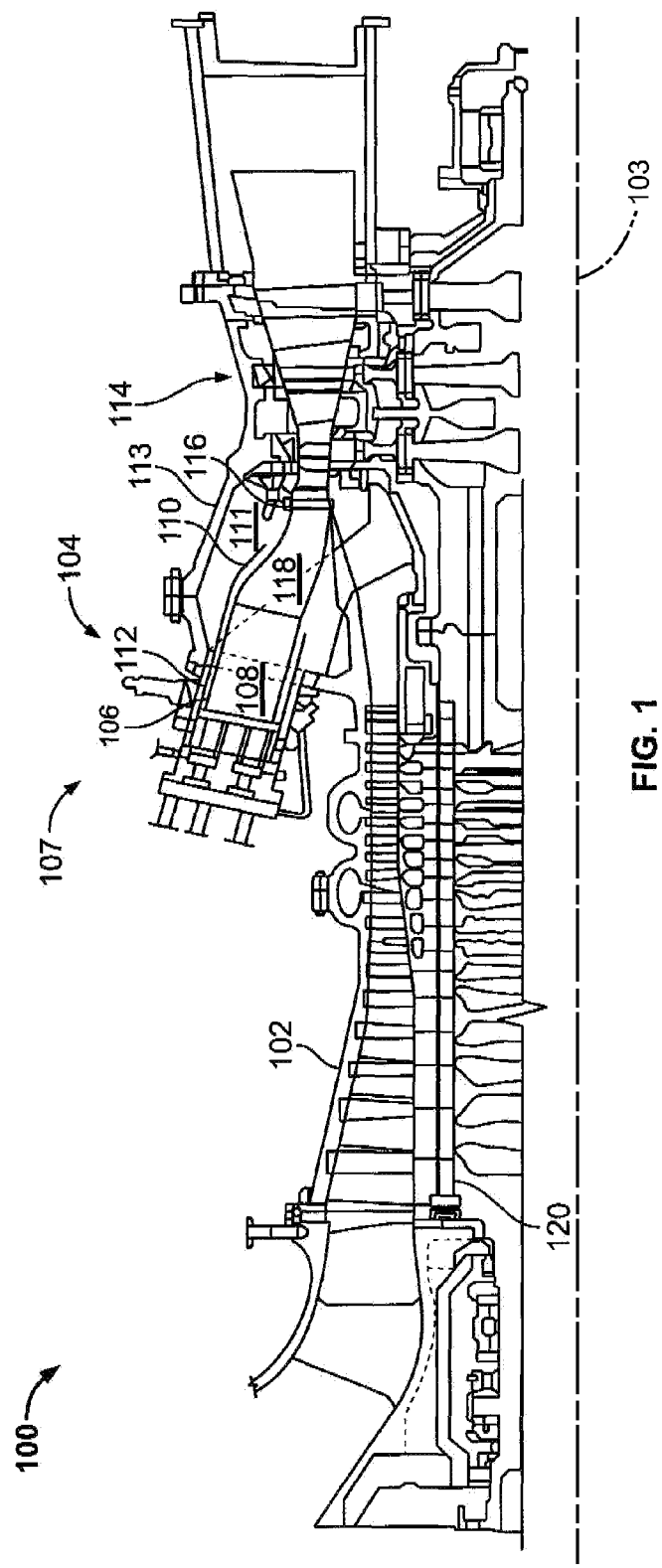
FIG. 1 is a schematic cross-sectional view of an exemplary gas turbine engine.

FIG. 1 is a schematic illustration of an exemplary gas turbine engine 100. In the exemplary embodiment, engine 100 includes a compressor assembly 102 and a combustor assembly 104. Engine 100 also includes a longitudinal axis 103 extending therethrough. Combustor assembly 104 includes a combustor liner 106 that at least partially defines a combustion chamber 108 and an axially outboard portion 107. Combustor assembly 104 also includes a flow sleeve 110 that at least partially extends about combustor liner 106. Combustor assembly 104 further includes a combustor case 112 that at least partially extends about flow sleeve 110. In the exemplary embodiment, engine 100 includes a plurality of combustor assemblies 104. Combustor assembly 104 and, more specifically, combustion chamber 108 is coupled downstream from and in flow communication with compressor assembly 102 via a plenum 111, wherein plenum 111 is at least partially defined by an engine case 113.

Engine 100 also includes a turbine assembly 114. Turbine assembly 114 includes a nozzle assembly 116 that is coupled in flow communication with chamber 108 via a transition piece 118. Transition piece 118 is coupled to combustor liner 106 and nozzle assembly 116, and extends therebetween. Engine 100 further includes a compressor/turbine rotor 120. Turbine 114 is rotatably coupled to, and drives, rotor 120. Compressor 102 is also rotatably coupled to shaft 120.

In operation, air flows through compressor 102 and a substantial amount of compressed air is supplied to combustor assembly 104 via plenum 111. Assembly 104 is also in flow communication with a fuel source (not shown in FIG. 1) and channels fuel and air to combustion chamber 108. In the exemplary embodiment, combustor assembly 104 ignites and combusts fuel, for example, synthetic gas (syngas) within combustion chamber 108 and generates a high temperature combustion gas stream (not shown in FIG. 1) of approximately 1316° Celsius (C.) to 1593° C. (2400° Fahrenheit (F.) to 2900° F.). Alternatively, assembly 104 combusts fuels that include, but are not limited to, natural gas and/or fuel oil. Transition piece 118 channels the combustion gas stream to nozzle assembly 116 of turbine 114 wherein gas stream thermal energy is converted to mechanical rotational energy and induces a rotation of rotor 120.

Figure 2:
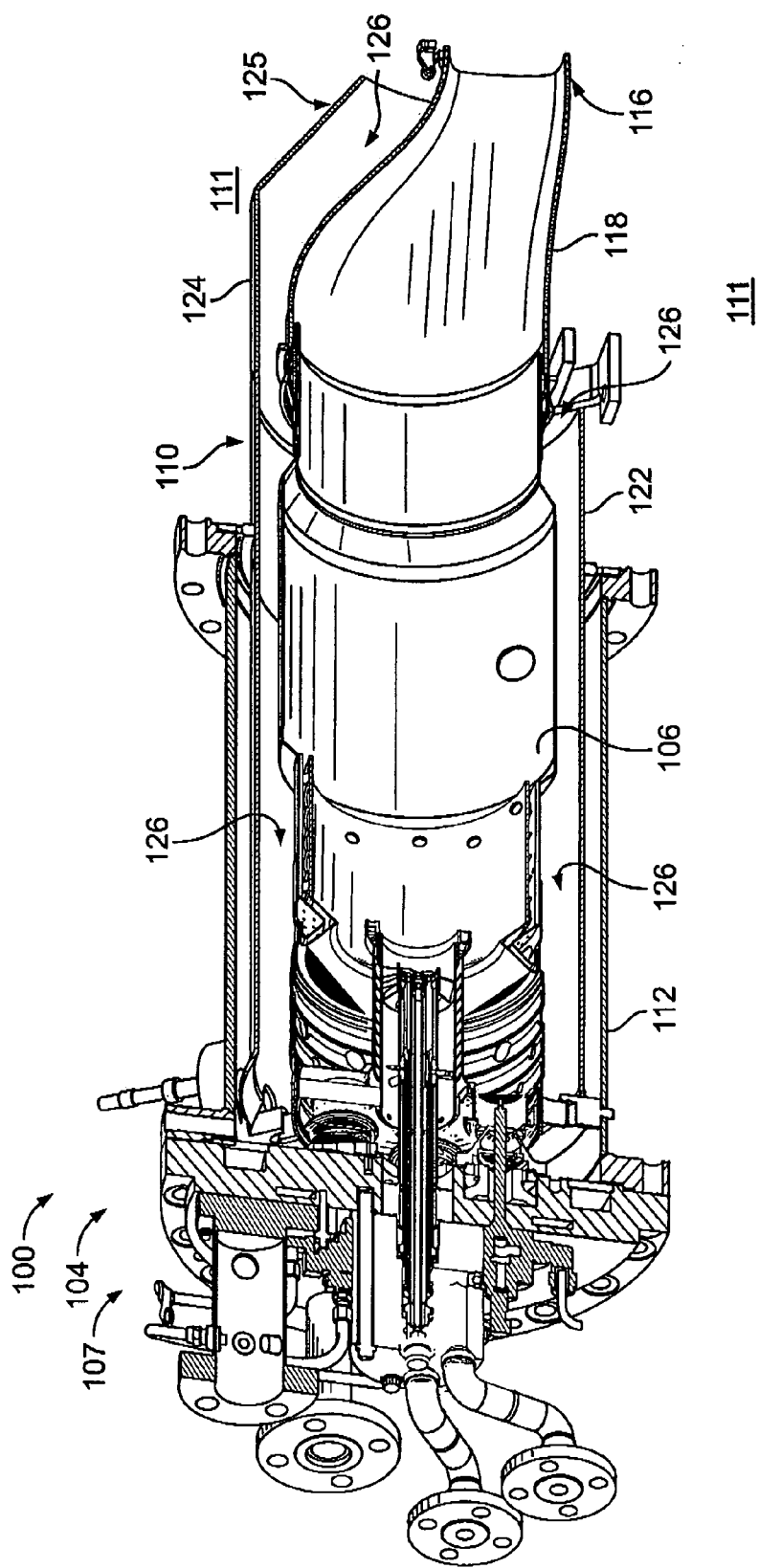
FIG. 2 is a cross-sectional view of an exemplary combustor assembly that may be used with the gas turbine engine shown in FIG. 1.

FIG. 2 is a cross-sectional view of combustor assembly 104. In the exemplary embodiment, flow sleeve 110 includes a first portion 122 and a second or extension portion 124. First portion 122 fully extends circumferentially about liner 106, and portion 124 includes a scoop 125 (described further below). Flow sleeve 110 cooperates with combustor liner 106 and transition piece 118 to define a unitary cooling air flow passage 126 that extends from transition piece 118 to combustor assembly outer portion 107.

Figure 3:
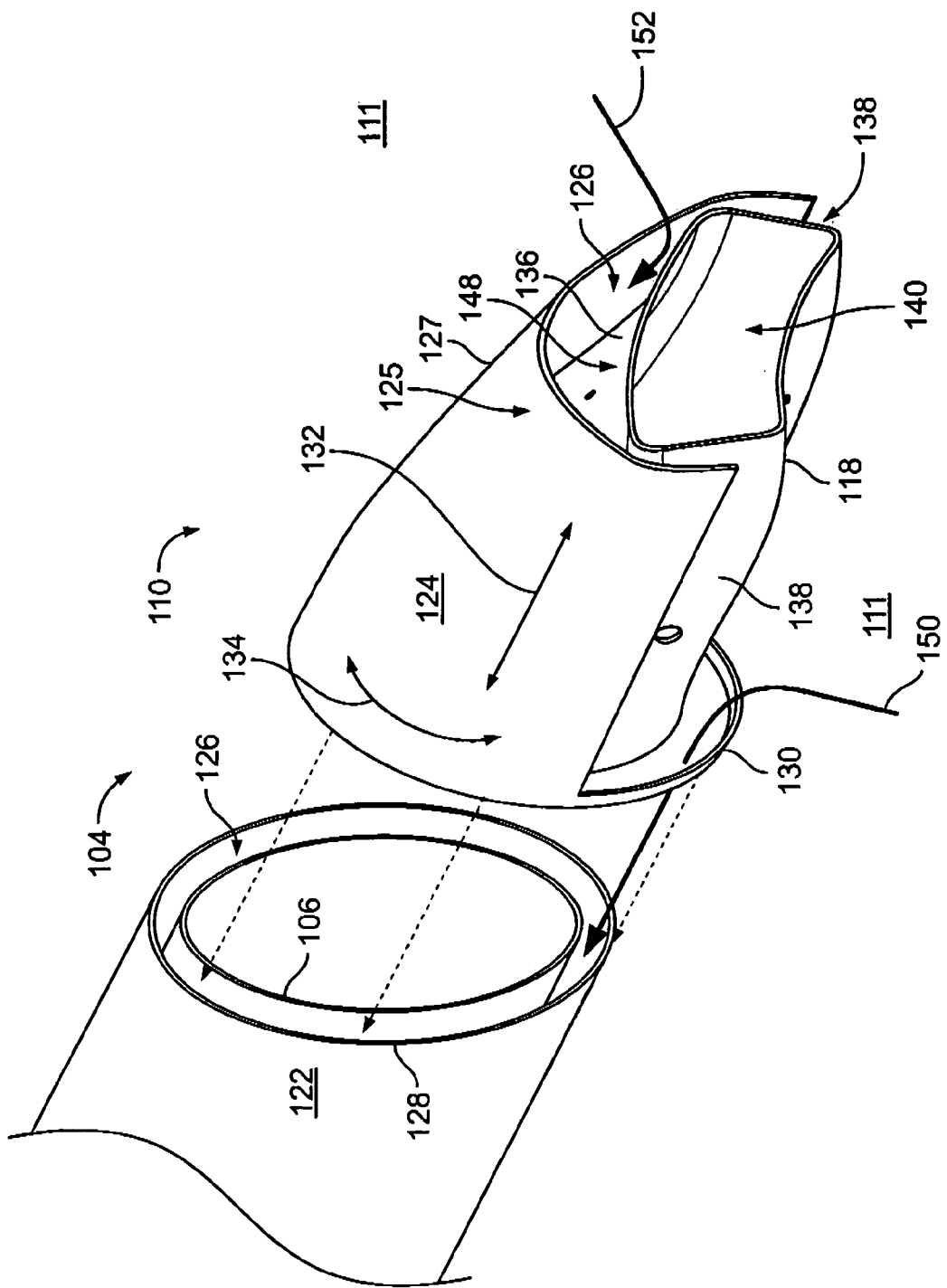
FIG. 3 is a perspective view of an exemplary flow sleeve that may be used with the combustor assembly shown in FIG. 2.

FIG. 3 is a perspective view of flow sleeve 110 that may be used with combustor assembly 104. In the exemplary embodiment, flow sleeve extension 124 has a shaped or scooped, profile, that is in the form of a scoop 125 having an apex 127. Also, in the exemplary embodiment, flow sleeve first portion 122 includes a circumferential coupling surface 128, and flow sleeve second portion 124 includes a substantially circular attachment ring 130. Ring 130 is sized to enable ring 130 to clear any interference with any other internal components of combustor 104, including, but not limited to, aft frame mounting brackets that include a bullhorn bracket (neither shown in FIG. 3). In the exemplary embodiment, portion 124 is coupled to portion 122 by welding attachment ring 130 to coupling surface 128. Alternatively, portions 122 and 124 may be coupled to each other using any coupling methods that facilitates securing portion 124 to portion 122 such as, but not limited to, brazing and retention hardware. When portion 122 is secured to portion 124, a circumferential smooth interface (not shown) is defined.

Transition piece 118 includes a top portion 136. Transition piece 118 also includes a plurality of side portions 138 that cooperate with top portion 136 to partially define a hot gas outlet 140. Flow sleeve second portion 124 extends generally axially 132 and circumferentially 134 over top portion 136. Moreover, portion 124 extends axially 132 and circumferentially 134 about any portion of transition piece 118 that enables flow sleeve 110 to function as described herein.

In the exemplary embodiment, unitary cooling air flow passage 126 extends axially 132 and circumferentially 134 between top portion 136 and second portion 124. Moreover, cooling air flow passage 126 extends from a unitary scoop-shaped opening 148, defined by transition piece 118 and second portion 124, to combustor assembly axially outboard portion 107 (shown in FIGS. 1 and 2). Opening 148 is positioned in flow communication with plenum 111.

An exemplary method of assembling gas turbine engine 100 is provided. The method includes coupling transition piece 118 between combustor liner 106 and nozzle assembly 116. The method also includes extending first portion 122 of flow sleeve 110 from transition piece 118 about at least a portion of combustor liner 106. The method further includes coupling second portion 124 of flow sleeve 110 to first portion 122 of flow sleeve 110 such that flow sleeve second portion 124 extends from flow sleeve first portion 122 and at least partially about at least a portion of transition piece 118. Flow sleeve second portion 124 includes scoop 125 that cooperates with transition piece 118 to at least partially define unitary cooling air passage 126 that includes unitary scoop-shaped opening 148. Scoop 125 is oriented to introduce a substantially uniform cooling air flow 152 to transition piece 118. Scoop 125 is positioned on a radially outermost portion of second portion 124, relative to longitudinal axis 103.

During operation, compressed air is channeled from compressor 102 (shown in FIG. 1) to plenum 111. A first portion 150 of such compressed air is channeled from plenum 111 into passage 126, wherein a majority of such air does not contact transition piece 118. Also, a second portion 152 of such compressed air channeled from compressor 102 is channeled from plenum 111 into opening 148. Second portion 152 of air is then channeled from opening 148 into passage 126 formed by top portion 136 of transition piece 118 and flow sleeve extension 124, and is then subsequently channeled into a portion of passage 126 formed by first portion 122 and liner 106.

Forming flow sleeve 110 with a predetermined shape, configuration, and/or orientation about transition piece 118 facilitates channeling second portion 152 of cooling air to predetermined portions of transition piece 118, and facilitates channeling cooling air flow towards top portion 136 of transition piece 118. Such second portion 152 of cooling air flow facilitates decreasing an operating temperature of top portion 136 and thereby extends a useful life expectancy of transition piece 118 by reducing thermal stresses induced to transition piece 118. Flow sleeve 110 can be shaped, configured, and/or orientated to channel cooling air to other portions of transition piece 118 and/or to other engine components in the vicinity of the transition piece 118 and/or flow sleeve 110. Moreover, installing flow sleeve extension 124 to an existing flow sleeve portion 122 facilitates reducing hardware procurement and installation, and thus reduces capital and labor costs associated with existing gas turbine engine 100 retrofits. Furthermore, extending a flow sleeve 110 about transition piece 118 facilitates easing the manufacture and production of a more repeatable airflow about each transition piece 118 within gas turbine engine 100.

Figure 4:
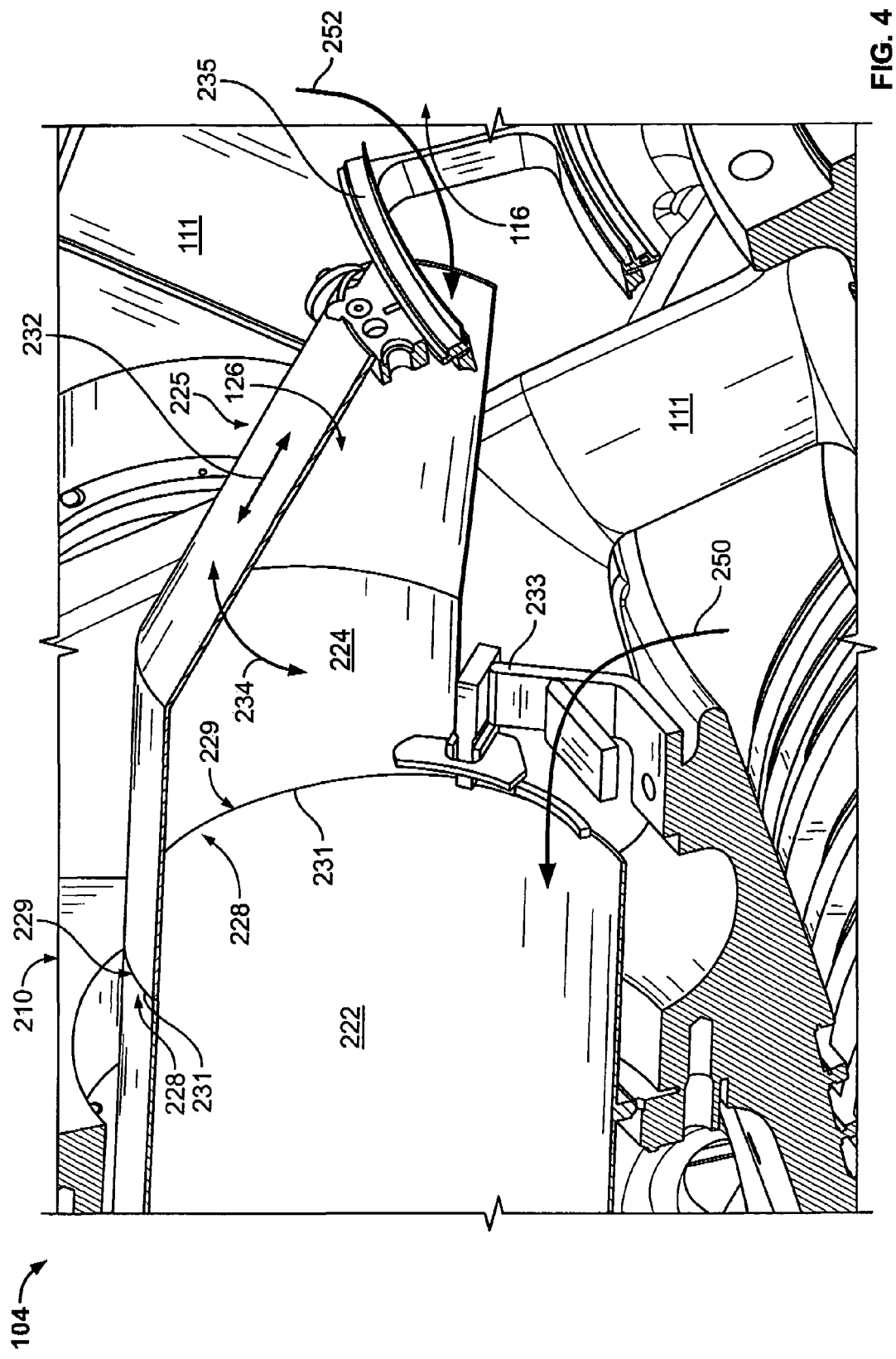
FIG. 4 is a cross-sectional view of an alternative flow sleeve that may be used with the combustor assembly shown in FIG. 2.

FIG. 4 is a cross-sectional view of an alternative flow sleeve 210 that may be used with combustor assembly 104. In this exemplary embodiment, flow sleeve 210 includes a first portion 222 and a second portion 224, wherein first portion 222 is substantially similar to first portion 122 (shown in FIGS. 2 and 3). In addition, second portion, or extension 224 is formed with a shaped or scooped, profile that is substantially similar to a shape of flow sleeve extension 124 (shown in FIGS. 2 and 3). Moreover, first portion 222 includes a circumferential coupling surface 228 that is substantially similar to surface 128 (shown in FIG. 3)

In this exemplary embodiment, unlike flow sleeve 110 (shown in FIG. 3), extension 224 of flow sleeve 210 does not include attachment ring 130. Rather, extension 224 includes a circumferential coupling surface 229 that enables extension 224 to be coupled to portion 222 via butt-welding surface 228 to coupling surface 229. Alternatively, portion 222 and extension 224 may be coupled together using coupling methods such as, but not limited to, brazing and/or retention hardware. When portion 222 is coupled to extension 224, a circumferential smooth interface 231 is defined along with an arc of approximately 180° to 200°. Alternatively, interface 231 may be of any size and shape that enables flow sleeve 210 to function as described herein.

Extension 224 is sized and shaped to ensure extension 224 does not contract or interfere with other internal components of combustor 104, including, but not limited to, aft frame mounting brackets such as a bullhorn bracket 233. Extension 224 also includes a scoop 225 that is similar to scoop 125 (shown in FIG. 3). Moreover, flow sleeve 210 cooperates with combustor liner 106 and transition piece 118 (both shown in FIGS. 2 and 3) to define cooling air flow passage 126. Similar to extension 124 (shown in FIGS. 2 and 3), extension 224 extends axially 232 and circumferentially 234 from first portion 222 to a hinge mounting bracket 235. Bracket 235 enables transition piece 118 (shown in FIGS. 2 and 3) to couple to nozzle assembly 116 (shown in FIGS. 2 and 3). Alternatively, extension 224 may have any size or shape that enables flow sleeve 210 to function as described herein. A first portion 250 and a second portion 252 of compressed air are discussed further below.

Figure 5:
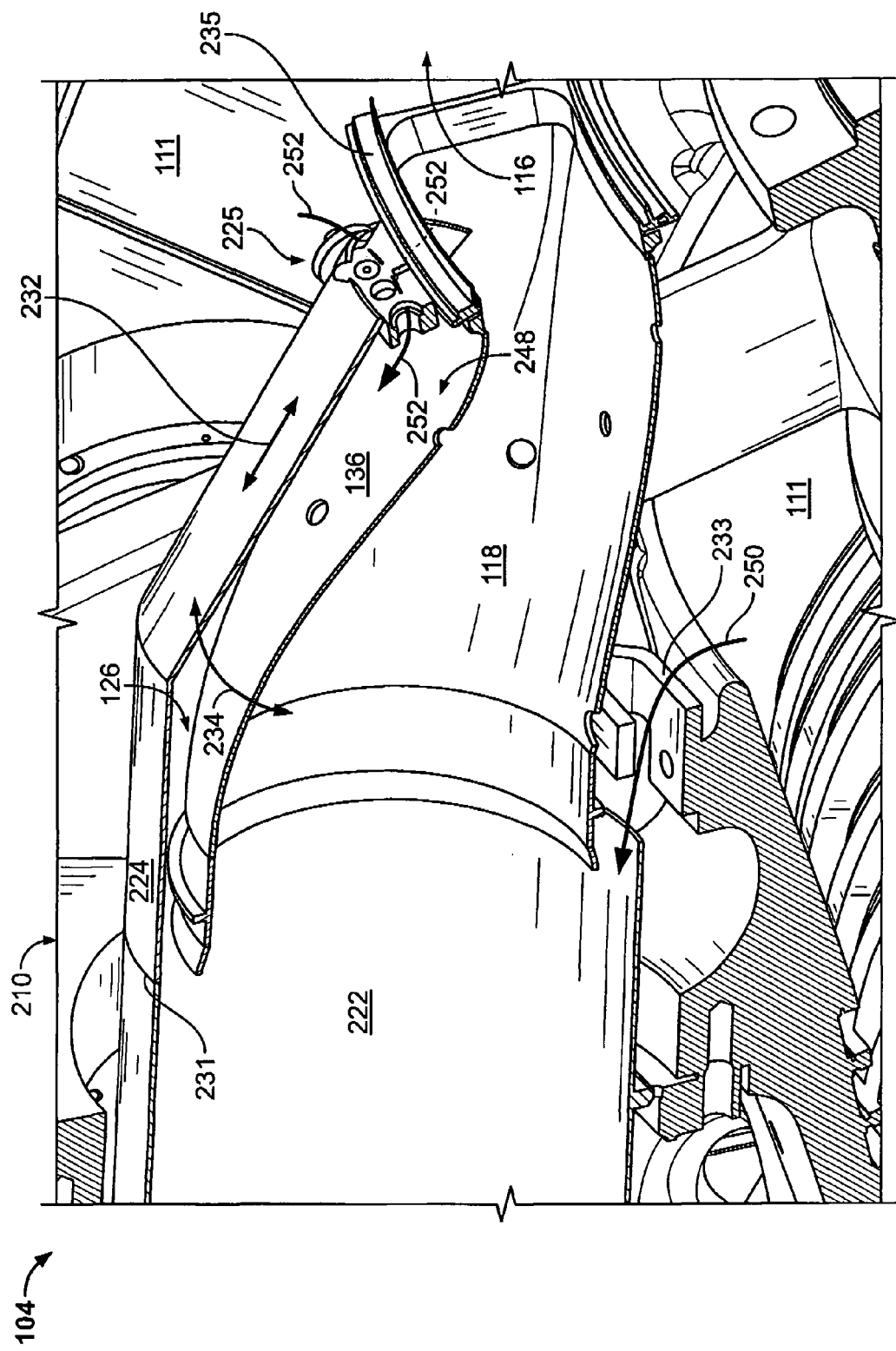
FIG. 5 is a cross-sectional view of the flow sleeve shown in FIG. 4 and coupled to an exemplary transition piece that may be used with the combustor assembly shown in FIG. 2.

FIG. 5 is a cross-sectional view of flow sleeve 210 extending about transition piece 118 for use with combustor assembly 104. As shown in FIG. 5, in the exemplary embodiment, extension 224 extends at least partially about transition piece 118. Moreover, extension 224 extends axially 232 and circumferentially 234 over transition piece top portion 136 and extends axially extends from first portion 222 to a hinge mounting bracket 235. Alternatively, extension 224 may have any size or shape that enables flow sleeve 210 to function as described herein. Also, in the exemplary embodiment, scoop 225 cooperates with transition piece top portion 136 to form a unitary, scoop-shaped opening 248 that is similar to opening 148 (shown in FIG. 3), and flow sleeve 210 cooperates with combustor liner 106 and transition piece 118 (both shown in FIG. 2) to define cooling air flow passage 126.

During operation, compressed air is channeled from compressor 102 (shown in FIG. 1) to plenum 111. A first portion 250 of such compressed air is channeled from plenum 111 into passage 126. A majority of such first portion 250 of air does not contact transition piece 118. A second portion 252 of such compressed air is channeled from plenum 111 to opening 248 and towards transition piece top portion 136. Second portion 252 of air is then channeled from opening 248 into passage 126. The effects of such operation are substantially similar to those effects described above for flow sleeve extension 124 (shown in FIGS. 2 and 3).

The above-described methods and apparatus for assembling gas turbine engines described herein facilitate operation of such gas turbines. Specifically, as described in more detail below, extending a flow sleeve with a predetermined shape, configuration, and/or orientation about a transition piece facilitates cooling predetermined portions of the transition piece. More specifically, the flow sleeve facilitates channeling cooling air flow to the top portion of the associated transition piece. Such cooling air flow facilitates decreasing an operating temperature of the transition piece and thereby extends a useful life expectancy of the transition piece by reducing thermal stresses induced in the transition piece. Also, as described herein, the flow sleeve can be shaped, configured, and/or orientated to facilitate channeling cooling air to other engine components in the vicinity of the transition piece and/or the flow sleeve, such as, for example, frame mounting brackets. Moreover, installing flow sleeve extensions to existing flow sleeves facilitates reducing hardware procurement and installation, thereby reducing capital and labor costs associated with retrofitting existing gas turbine engines. Furthermore, extending the flow sleeve about the transition piece facilitates the ease of manufacture and the production of a more repeatable airflow about each transition piece within the gas turbine engine.

Exemplary embodiments of methods and apparatus for assembling gas turbine engines and operation of such gas turbine engines are described above in detail. The methods and systems are not limited to the specific embodiments described herein, but rather, components of systems and apparatus and/or steps of the methods may be utilized independently and separately from other components and/or steps described herein. For example, the methods may also be used in combination with other engines and methods, and are not limited to practice with only the gas turbine engines as described herein. Rather, the exemplary embodiment can be implemented and utilized in connection with many other engine applications.

While the invention has been described in terms of various specific embodiments, those skilled in the art will recognize that the invention can be practiced with modification within the spirit and scope of the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for assembling a gas turbine engine, said method comprising:
    coupling a transition piece between a combustor liner and a nozzle assembly;
    extending a first portion of a flow sleeve from the transition piece to circumscribe at least a portion of the combustor liner; and
    coupling a second portion of the flow sleeve to the first portion of the flow sleeve such that the second portion extends axially from the first portion and at least partially about at least a portion of the transition piece, wherein the second portion includes a scoop that cooperates with the transition piece to at least partially define a unitary cooling air passage that includes a unitary scoop-shaped opening, wherein the scoop is oriented to introduce a substantially uniform cooling air flow to the transition piece, and wherein the scoop extends from a radially outermost portion of the second portion of the flow sleeve, relative to a longitudinal axis extending through the gas turbine engine wherein the scoop-shaped opening is formed at a radially innermost portion of the transition piece.

2. A method in accordance with claim 1 wherein coupling a second portion of the flow sleeve to the first portion of the flow sleeve further comprises coupling the scoop in flow communication with a cooling air source.

3. A method in accordance with claim 1 wherein coupling the second portion of the flow sleeve to the first portion of the flow sleeve comprises welding at least a portion of the flow sleeve first portion to at least a portion of the flow sleeve second portion.

4. A method in accordance with claim 3 wherein welding at least a portion of the flow sleeve first portion to at least a portion of the second portion comprises welding at least a portion of an attachment ring to the flow sleeve first portion.

5. A method in accordance with claim 1 wherein coupling a second portion of the flow sleeve to the first portion of the flow sleeve comprises positioning the unitary cooling air passage about at least a top portion of the transition piece.

6. A method in accordance with claim 1 wherein coupling a second portion of the flow sleeve to the first portion of the flow sleeve comprises extending at least a portion of the scoop about at least a side portion of the transition piece such that at least a portion of the scoop extends below a predetermined portion of the transition piece side portion.

7. A combustor assembly for use with a turbine engine, said combustor assembly comprising:
    a combustor liner coupled in flow communication with a transition piece; and
    a flow device comprising:
        a first portion sized to circumscribe at least a portion of said combustor liner; and
        a second portion coupled to and extending axially from said flow device first portion, said flow device second portion at least partially extends about at least a portion of said transition piece, wherein said flow device second portion comprises a scoop that cooperates with said transition piece to define a unitary cooling air passage including a unitary scoop-shaped opening such that said scoop is oriented to introduce a substantially uniform cooling air flow to said transition piece, and wherein the scoop extends from a radially outermost portion of the second portion of the flow device, relative to a longitudinal axis extending through the turbine engine wherein the scoop-shaped opening is formed at a radially innermost portion of the transition piece.

8. A combustor assembly in accordance with claim 7 wherein at least a portion of said flow device first portion is welded to at least a portion of said flow device second portion.

9. A combustor assembly in accordance with claim 8 wherein said flow device second portion comprises an attachment ring.

10. A combustor assembly in accordance with claim 9 wherein at least a portion of said attachment ring is welded to the at least a portion of said flow device first portion.

11. A combustor assembly in accordance with claim 7 wherein said flow device extends from a portion of said combustor liner to a nozzle assembly of the turbine engine.

12. A combustor assembly in accordance with claim 7 wherein said transition piece comprises a top portion and the unitary cooling air passage and the unitary scoop-shaped opening are oriented to extend over said transition piece top portion.

13. A combustor assembly in accordance with claim 7 wherein said scoop is coupled in flow communication with a cooling air source.

14. A gas turbine engine comprising:
    a transition piece extending in flow communication between a combustor liner and a nozzle assembly; and
    a flow device comprising:
        a first portion sized to circumscribe at least a portion of said combustor liner; and
        a second portion coupled to and extending axially from said flow device first portion, said flow device second portion at least partially extends about at least a portion of said transition piece, wherein said flow device second portion comprises a scoop that cooperates with said transition piece to define a unitary cooling air passage including a unitary scoop-shaped opening such that said scoop is oriented to introduce a substantially uniform cooling air flow to said transition piece, and wherein the scoop extends from a radially outermost portion of the second portion of the flow device, relative to a longitudinal axis extending through the gas turbine engine wherein the scoop-shaped opening is formed at a radially innermost portion of the transition piece.

15. A gas turbine engine in accordance with claim 14 wherein at least a portion of said flow device first portion is welded to at least a portion of said flow device second portion.

16. A gas turbine engine in accordance with claim 15 wherein said flow device second portion comprises an attachment ring.

17. A gas turbine engine in accordance with claim 16 wherein at least a portion of said attachment ring is welded to at least a portion of said flow device first portion.

18. A gas turbine engine in accordance with claim 14 wherein said flow device extends from a portion of said combustor liner to said nozzle assembly.

19. A gas turbine engine in accordance with claim 14 wherein said transition piece comprises a top portion and the unitary cooling air passage and the unitary scoop-shaped opening are oriented to extend over said transition piece top portion.

20. A gas turbine engine in accordance with claim 14 wherein said scoop is coupled in flow communication with a cooling air source.

* * * * *